(12) United States Patent
Hander et al.

(10) Patent No.: US 6,893,673 B2
(45) Date of Patent: May 17, 2005

(54) METHOD FOR CONTROLLING SNACK PRODUCT BLISTERING THROUGH THE USE OF SOLID LIPID PARTICLES

(75) Inventors: Jennifer Elizabeth Hander, Frisco, TX (US); Brian Peter Jacoby, Plano, TX (US); Joseph William Kelly, Grapevine, TX (US); Nolvia Elizabeth Zelaya, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 100 days.

(21) Appl. No.: 10/198,531

(22) Filed: Jul. 18, 2002

(65) Prior Publication Data

US 2004/0013782 A1 Jan. 22, 2004

(51) Int. Cl.$^7$ .................................................. A21D 2/00
(52) U.S. Cl. ....................... 426/560; 426/438; 426/439; 426/653; 426/808
(58) Field of Search ................................ 426/560, 808, 426/439, 438, 96, 653

(56) References Cited

U.S. PATENT DOCUMENTS

| | | |
|---|---|---|
| 2,905,559 A | 9/1959 | Anderson et al. |
| 2,916,378 A | 12/1959 | Kunce et al. |
| 3,608,474 A | 9/1971 | Liepa |
| 3,883,671 A | 5/1975 | Shatila |
| 4,861,609 A | 8/1989 | Willard et al. |
| 4,889,733 A | 12/1989 | Willard et al. |
| 4,931,303 A | 6/1990 | Holm et al. |
| 4,994,295 A | 2/1991 | Holm et al. |
| 4,999,208 A | 3/1991 | Lengerich et al. |
| 5,928,700 A | 7/1999 | Zimmerman et al. |
| 5,980,967 A | 11/1999 | Carey et al. |
| 6,346,287 B1 * | 2/2002 | Ibuki et al. ................. 426/450 |
| 6,393,804 B1 | 5/2002 | Ausnit |
| 6,406,737 B1 * | 6/2002 | Cain et al. .................. 426/601 |

* cited by examiner

*Primary Examiner*—Lien Tran
(74) *Attorney, Agent, or Firm*—Colin P. Cahoon; Carstens, Yee & Cahoon, L.L.P.

(57) ABSTRACT

An improved method for controlling blister formation in fabricated, expanded snack products by utilizing discrete, solid lipid particles. These lipids must be solid at room temperature with a melting point above 100° F. such that they remain discrete and solid when mixed with the dough and are subsequently sheeted or extruded. During the toasting, frying, or baking step, the solid, lipid particles melt and soften and disrupt the starch matrix, thus allowing steam to escape and preventing blisters. The blisters are only prevented, however, in the localized area where a solid, lipid particle exists. Thus, by changing the level of solid, lipid particles in the dough, the size of resulting blisters can be controlled.

19 Claims, No Drawings

METHOD FOR CONTROLLING SNACK PRODUCT BLISTERING THROUGH THE USE OF SOLID LIPID PARTICLES

BACKGROUND OF THE INVENTION

1. Technical Field

The present invention relates generally to a method for making snack food products that are crisp with blisters (hollow voids or surface bubbles). More particularly, the invention relates to a method of using solid lipid particles for the purpose of controlling the size of blisters on fabricated, expanded snack products.

2. Description of Related Art

Many types of fabricated snack products exist, both baked and fried. These snacks are commonly made by preparing a moist dough comprised of farinaceous materials. The dough is formed, such as by extrusion or by rolls, into a thin sheet. Upon frying or baking, the moisture within the dough is converted to steam, which causes the pieces to expand. With proper control of formulation and baking/frying conditions, known to one skilled in the art, the expanding steam will form voids within the product that will be maintained in the final product. These voids (also known as blisters, or bubbles) result in a less dense snack, which is crisp and appetizing without being too hard and dense to chew.

Under some conditions of baking/frying, however, undesirably large blisters (greater than 1.5 inches in the longest dimension), or bubbles, can form. This is common when frying above 300° F. or baking above 400° F. (or with high air velocities). These large blisters are the result of accumulation of steam between the outer surfaces of the dough pieces during frying or baking. The outer surfaces of the snack piece lose moisture faster than the center of the piece, due to more rapid heat transfer at the surface when frying or baking. When this surface dries sufficiently, it forms a "skin" or "crust" which can prevent escape of steam from the interior of the piece. The trapped steam causes the sides of the dough piece to separate, or delaminate, forming a hollow void. When the void is approximately as large on its surface as the surface area of the piece, this phenomena is commonly referred to as "pillowing." Excessive blisters, large blisters, and pillowing can detract from the appearance of the snack, and can break, causing holes in the product.

There is considerable prior art directed to controlling the size of blisters and eliminating pillowing. One method is to use low temperatures of baking or frying. These low temperatures result in extended baking/frying times that give the steam time to escape without forming a void. Low bake/fry temperatures, however, usually result in a less crisp, or less "chip-like" texture.

Another means known in the prior art for controlling blister sizes is to use a very thin dough sheet, meaning a sheet of dough having a thickness of less than 0.030 inches. In a thin dough sheet, the skin thickness is not sufficient to prevent steam from escaping from the product, so large voids, or blisters, do not form. Doughs which are sheeted to thicknesses over 0.030 inches, however, are prone to the formation of large, undesirable blisters.

Another means to control blisters is to include large, dry, dense, food particles in the dough. This has previously been detailed by Willard, et al. (U.S. Pat. No. 4,861,609) and is commonly done in tortilla chips by including granular pieces of the corn horny endosperm in the chip. These large, dry particles do not form a cohesive skin so they provide a means for moisture to escape, so as to reduce pillowing and undesirably large blisters. Kunce (U.S. Pat. No. 2,916,378) also details that coarsely ground particles create a discontinuous matrix from which steam can escape. These large, dry particles can detract from the appearance of the product, however, and result in a gritty texture.

Shatila, et al. (U.S. Pat. No. 3,883,671) discloses a method for reducing surface blisters by moistening the surface of the dough pieces after forming, but before frying. This moistening of the surface most likely reduced the formation of a surface "skin" during frying, and thus reduced blister formation. Moistening the surface prior to baking or frying, however, will increase the necessary baking or frying time, as well as altering the texture and appearance of the surface of the snack product.

Mechanical means can also be used to prevent pillowing or minimize blister size. Anderson, et al. (U.S. Pat. No. 2,905,559) avoids pillowing/blistering by perforating the dough sheet with spikes. Willard, et al. (U.S. Pat. No. 4,889,733) uses a rotating bristle brush to form dockering holes. Dockering holes are used in the Willard process to prevent pillowing. Perforating a dough sheet does reduce pillowing/large blisters, by providing holes for the steam to escape through, but results in holes or dimples or the final product, which may be undesirable.

Liepa, et al. (U.S. Pat. No. 3,608,474) teaches confining the dough pieces within a mold to prevent large blisters from forming. This results in a more complicated and expensive manufacturing process.

Carey, et al. (U.S. Pat. No. 5,980,967) discloses a formulation, and hydration procedure, to control blistering in a baked, snack product. Two patents issued to Holm, et al. (U.S. Pat. No. 4,931,303 and U.S. Pat. No. 4,994,295) detail a process of partially drying the surface of a dough layer, thus producing a preform having a dry outer layer and a wet inner layer. Such a procedure results in a more complex manufacturing procedure. The Holm, et al. patents also disclose the procedure of allowing a dough to equilibrate for a few minutes, prior to frying, to control blisters. This is also commonly done in the tortilla manufacturing process. The equilibration time produces more uniform distribution of water within dough, as well as reduces the moisture content by evaporation. This lower moisture content, for example about 25% by weight, uniformly distributed in the snack dough, will create smaller blisters than doughs that have a localized area with high moisture where a blister will form. This equilibration time can be rate limiting, however, and the necessary equilibration time increases with thicker doughs. Similar results can be obtained by excessively pre-baking the product, but this can lead to burnt chips and other unfavorable chip characteristics.

Added ingredients can also be used to reduce blistering. Zimmerman, et al. (U.S. Pat. No. 5,928,700) described adding emulsifiers to fried snack products to reduce pillowing/blistering. Emulsifiers can affect the moisture holding characteristics of the dough, or minimize the moisture necessary to create the dough, both of which can reduce pillowing and large blisters. Zimmerman, et al. state that in their formulation it is important to disperse and thoroughly mix the emulsifier with the other ingredients and it is preferable to dissolve the emulsifier prior to the mixing step. Further, the use of "solid" lipids in Zimmerman only refers to fats that are solids at room temperature but are actually liquefied as part of the mixing/dispersion step. No mention is made of any resultant discrete, solid particles of lipid over 0.010 inches in diameter, and it is noted that the emulsifier had an effect on the texture of the product. Use of lipids in a liquid state in the dough, or lipids which become plastic or liquid during dough formation, or solid lipids in a fine powder will result in a thorough distribution of the lipid throughout the dough during mixing/sheeting with no localized area of discrete lipid larger than 0.010 inches. Such small droplets of liquid, plastic, or fine powder lipid will enhance interaction of the lipid with the starches in the dough, which will alter the texture and properties of the final product. Also, a liquid, plastic, or fine powder lipid, when finely distributed in a dough as small droplets or powder, will reduce pillowing/blistering but will also reduce the formation of the desirable blisters (0.125 inches to 1.5 inches) necessary to create a crispy, chip-like texture and appealing, less "processed" surface appearance. This will result in a less expanded, denser, texture.

Lengerich, et al. (U.S. Pat. No. 4,999,208) used lipid-encapsulated particles to deliver additives in fabricated products. These lipid containing particles were not solid above 100 F, and were not used for blister control.

It should be understood that production of many chip-like products that are ultimately fried or baked often go through a mixing and sheeting process which, depending on ambient conditions, can result in a final dough temperature of between 60° F. and 110° F. Consequently, any lipid added to the dough with a melting point below the temperature level that the product reaches during this stage will melt and become a liquid. In addition, even if a lipid has a complete melting point above 110° F., it may still have significant levels of liquid lipids present below 110° F. Once a lipid becomes a liquid during the mixing/sheeting step, it will disperse in the dough and not only reduce pillowing/large blisters on the product, but also will reduce desirable blister levels. For example, in tortilla chips, it is desirable to have small to medium sized blisters along the surface of the chip. These desirable blisters, typically in the range of 0.125 inches to 1.5 inches in diameter, are reduced when a liquid or solid lipid with a low melting point is added to the dough during dough formation.

Lipids with melting points above such processing temperatures, for example lipids having a melting point above 140° F. and IV values below 15, are available in the prior art, but only in powdered (less than 0.010 inches in largest dimension) or flaked (greater than 0.70 inches in largest dimension) form. The addition of a powdered lipid having a high melting point to a dough can reduce pillowing but will also reduce desirable sized blisters. The addition of lipids with a high melting point in a flake form will resolve the pillowing/large blisters problem while maintaining desirable size blisters. However, lipid flakes cannot be used in products having a thickness between 0.030 inches and 0.055 inches because such flakes typically have a diameter (greater than 0.070 inches) large enough that holes in the product are left when the large lipid flakes are subjected to cooking temperatures by either baking or frying.

Consequently, there exists no acceptable method in the prior art for regulating the size of blisters and reduce pillowing in a snack product having a sheeted or extruded pre-cooked thickness of between 0.030 inches and 0.055 inches that is exposed to pre-cooking processing temperatures from 60° F. to 110° F. In such instances, the prior art does not disclose a successful means of controlling blisters independent of thickness without; 1) the addition or coarse, gritty particles, 2) moistening the surface, 3) mechanical means which produce holes in the product or result in a complicated manufacturing procedure, 4) equilibrating the dough for extended periods of time, 5) or adding lipids in a liquid, plastic, or fine solid powder state which substantially interact with the dough and modify the resultant texture as well as substantially reducing desirable sized blisters.

Thus, a need exists for a method for controlling the blister size in a snack food product having a pre-cooked thickness of 0.030 inches to 0.055 inches with a mixing/sheeting processing step requiring exposure of the product to temperatures from 60° F. to 110° F. Such method should be simple and inexpensive to implement without changing the desirable taste characteristics of the chip.

SUMMARY OF THE INVENTION

The present invention is an improved method for controlling blister formation in fabricated, expanded snack products by utilizing discrete, solid lipid particles having a high melting point and specific particle size. Such fabricated, expanded snacks are those made by preparing a moist dough comprised of farinaceous materials, including but not limited to; corn, potato, rice, oats, tapioca, wheat, lime-treated corn, buckwheat flour, bean flour, barley flour, wheat germ, rye flour, sorghum flour, graham flour, and mixtures thereof. These doughs may also include added starches, gelatinized or ungelatinized, as well as leavening ingredient and other fats or emulsifiers, as long as the solid, lipid particles are not dissolved in the other fats or emulsifiers. The moisture level of these doughs may range from 25% to 70% of the total dough.

To this dough is then added solid, lipid particles having a high melting point and specific particle size. The lipid used can include triglycerides, mono or diglycerides, reduced-calorie fats, other emulsifiers, animal, marine or vegetable fat which can be partially or fully hydrogenated, nondigestable fats or oils, and reduced calorie fats and oils. These lipids must be solid at room temperature with a melting point above 110° F., more preferable above 120° F., and even more preferable above 140° F., such that they remain discrete and solid when mixed with the dough and are subsequently sheeted or extruded. The lipid particles are added to the dough at a level of 0.05% to 5% by weight of the dough. The solid, lipid particles should have a particle size between 0.010 inches and 0.10 inches, more preferable between 0.020 inches and 0.040 inches. The dough is then formed into a sheet, using rollers or extrusion. The addition of solid, lipid particles, disclosed in this invention, allows sheet thicknesses over 0.030 inches without the formation of large, undesirable blisters. Yet, desirable size blisters are still allowed to form.

The sheeted dough is then cut into pieces, which can be toasted, although this is not essential, and then fried or baked to reduce the moisture content of the final product below 4%. During the toasting, frying, or baking step, the solid, lipid particles will now melt locally and soften and disrupt the starch matrix and allow steam to escape, thus preventing blisters. The blisters are only prevented, however, in the localized area where a solid, lipid particle exists.

Desirable sized blisters can still form in the area between lipid particles. Thus, by changing the level of solid, lipid particles in the dough, the size of resulting blisters can be controlled. This control of blister size can be accomplished regardless of the thickness of the sheeted dough, dough composition, equilibration time, starch particle size in the dough, or whether the finished product is baked or fried.

In addition, since the lipid particles only melt during the toasting, frying, or baking step, (when the dough is quite viscous) there is not appreciable migration or interaction of the lipid particles with the bulk of the dough, so any effect on the overall texture of the dough, and finished snack product, is minimal. Also, by careful selection of the lipid source and particle size, these lipid particles are not apparent in the finished product and do not significantly affect the flavor of the finished product.

Consequently, the method provides an inexpensive means of controlling the blister size in fabricated, expanded snack food products without greatly increasing the processing costs or complexity. Further, the addition of the lipids described herein do not affect the taste or other desirable characteristics of the chip.

DETAILED DESCRIPTION

The present invention is an improved method for controlling blister formation in fabricated, expanded snack products, such as tortilla chips, by utilizing discrete, solid lipid particles. The lipid used can include triglycerides, mono or diglycerides, reduced-calorie fats, other emulsifiers, animal, marine or vegetable fat which can be partially or fully hydrogenated, nondigestable fats or oils, and reduced calorie fats and oils. These lipids must be solid at room temperature with a melting point above 110° F., more preferable above 120° F., and even more preferable above 140° F., such that they remain discrete and solid when mixed with the dough and are subsequently sheeted or extruded. These lipids should also have an IV value below 15, more preferable below 10, and most preferably below 5. Use of solid particles with melting points below 110° F., or IV values above 15, can result in the lipid melting or softening during dough formation (mixing/sheeting). The melted, or softened, lipid will then disperse when the dough is mixed into small particles (<0.010 inches) uniformly dispersed throughout the dough. These small, uniformly distributed lipid droplets will then inhibit desirable sized blister formation throughout the snack piece and result in a denser, harder texture, just as adding lipids in a liquid state cause the same phenomena. Examples of lipids having the appropriate melting point characteristics for the present invention include hydrogenated soybean oil, cotton seed oil, and other lipids having an iodine value below 5 and a melting point above, preferable, 140° F.

The lipid particles are added to the dough in accordance with the present invention at a level of 0.1% to 5% by weight of the dry material in the dough (dry basis). Use of levels below 0.1% result in such large dough areas between individual lipid particles, that large blisters still form. Use of levels over 5% result in such small areas between lipid particles that even desirable blisters are not able to form, and a harder, denser texture will result. The most desirable level of solid, lipid particles for any given snack product, is based on the thickness and density of the dough piece to be fried/baked, the size and density of the lipid particles used, and the desired size of the blisters on the final product.

The solid, lipid particles should have a particle size between 0.010 inches and 0.10 inches. Particle sizes below 0.010 inches are too small to sufficiently disrupt the dough matrix and permit steam to escape. At elevated levels, particles below 0.010 inches can disrupt the dough matrix and prevent pillowing but desirable size blisters will also be eliminated. Particles above 0.10 inches will leave visible holes in the product if the dough thickness is 0.10 inches or below. If dough thickness below 0.1 inches is used, the maximum lipid particle size cannot be greater than the dough thickness, or a hole will be present in the final baked/fried snack product.

The primary ingredient in the fabricated, expanded snack products described in this invention is a farinaceous flour or meal, including but not limited to; corn, potato, rice, oats, tapioca, wheat, lime-treated corn, buckwheat flour, bean flour, barley flour, wheat germ, rye flour, sorghum flour, graham flour, and mixtures thereof. Optional ingredients include starches (pregelatinized or cook-up, chemically modified or unmodified), leavening ingredients, proteins, and non-solid fats or emulsifiers, as long as the non-solid fats do not interact with the solid, lipid particles to soften or dissolve them. The primary and optional ingredients are then preferably blended together, along with the solid, lipid particles and water to form a dough with a moisture range of from 25% to 70% of the weight of the total dough. The order of addition of the ingredients, and manner of mixing, can be varied as long at the resultant dough has uniformly distributed solid lipid particles that have not been reduced in size below 0.01 inches and do not interact with the surrounding dough.

The dough is then formed, such as by extrusion or by rolls, into a thin sheet, ranging from 0.015 inches to 0.10 inches. This sheet is then cut into pieces, which can be toasted, although this is not essential, and then fried or baked to reduce the moisture content of the final product below 4%. During the toasting, frying, or baking step, the solid, lipid particles will now melt and soften and disrupt the starch matrix and allow steam to escape thus preventing blisters. The blisters are only prevented, however, in the localized area where a solid, lipid particle exists. Desirable blisters (meaning typically blisters ranging in diameter from 0.125 inches to 1.5 inches, but certainly smaller than the surface area of the product) can still form in the area between lipid particles. Thus, by changing the level of solid, lipid particles in the dough, the size of resulting blisters can be controlled. This control of blister size can be accomplished regardless of the thickness of the sheeted dough, dough composition, equilibration time, starch particle size in the dough, or whether the finished product is baked or fried.

In addition, since the lipid particles only melt during the toasting, frying, or baking step, (when the dough is quite viscous) there is not appreciable migration or interaction of the lipid particles with the bulk of the dough, so any effect on the overall texture of the dough, and finished snack product, is minimal. Also by careful selection of the lipid source and particle size, these lipid particles are not apparent in the finished product and do not significantly affect the flavor of the finished product.

The following are examples of several embodiments of the present invention:

EXAMPLE 1

A dry feed of base materials is added to and mixed in a ribbon blender. The dry feed comprises the following by weight: 93.8% instant masa flour, 4.7% of an unmodified waxy corn starch, and 1.5% of solid, lipid particles. The instant masa flour has a particle distribution of 0% on a U.S. #40 Standard sieve, 80% through a #60 U.S. Standard sieve and a moisture content of 11%. The solid, lipid particles are composed of 100% hydrogenated soybean oil with a maximum Iodine Value of 5, a melting point of over 150° F., and with a particles size of 100% through a #18 U.S. Standard Sieve and 100% on a #60 U.S. Standard Sieve (particle size between 0.040 inches and 0.01 inches). The dry feed is mixed at 500 RPM in the ribbon blender to sufficiently mix the ingredients prior to being fed to the extruder, about one to two minutes.

Water is then added to the dry mix at a ratio of 4 parts water to 5 parts dry mix. This blend is then mixed in the ribbon blender for about 5 minutes to form a dough. This dough is then sheeted between rollers to form a thin, continuous sheet with a thickness of approximately 0.046 inches and a moisture content by weight of approximately 50%. This sheet is then cut by a cutter roll into individual, shaped pieces with the shape being a quarter circle (or pie wedge) with a radius of approximately 3 inches.

These shaped, pieces are then passed through a toasting dryer to reduce their moisture prior to frying. This dryer has a residence time of 50 seconds and a temperature of 580° F. The dryer belting can be either mesh or slats, as is common in tortilla manufacturing, and the dryer can be single, or multi-pass. After exiting the toasting dryer, the moisture by weight of the shaped, product pieces has been reduced to approximately 34%. Blisters will have formed in the dryer, because of steam escape from the product, but less than 10% of the product will have blisters over 1.5 inches in diameter because of the action of the solid, lipid particles. Because the product is still moist, the blisters are not set at this point, and will flatten out as the product cools exiting the fryer.

The pieces are then allowed to condition for three minutes at ambient conditions on open mesh belting and then drop into a fryer. The fryer contains partially hydrogenated soybean oil at 375° F. and the shaped, product pieces are fried for a period of 70 seconds, until their moisture content has been reduced to between 0.5% and 3% by weight, more preferably 1.5%. During frying, the rapid escape of steam will create blisters, and reinflate blisters created in the toast oven. Again, less than 10% of the product will have blisters over 1.5 inches in diameter because of the solid, lipid particles.

It should be noted that if, instead of the dry feed mixture described above, a dry feed comprising by weight 95% instant masa flour and 5% of an unmodified waxy corn starch is used, the resulting product is completely delaminated across the whole surface of the chip (100% pillowed). This is true even though all other processing conditions and moisture additions remain the same.

EXAMPLE 2

A dry feed of base materials is added to and mixed in a ribbon blender. The dry feed comprises the following by weight:

| INGREDIENTS | % |
| --- | --- |
| Wheat Flour | 37.9 |
| Modified Starch | 19.0 |
| Soy Lecithin | 1.9 |
| Monocalcium Phosphate | 0.8 |
| Sodium Bicarbonate | 0.7 |
| White Maseca Flour | 38.6 |
| Solid lipid particles | 1.1 |

The dry feed is mixed in a ribbon blender for two minutes to sufficiently mix the ingredients. To this dry blend is then added one part partially hydrogenated soybean oil to sixteen parts dry mix (1:16). The soybean oil is warmed to 100° F. at which point it is completely liquid, but is not warm enough to melt the solid, lipid particles which are present in the dry blends. The solid, lipid particles are never added directly to the 100° F. oil. This mixture is then blended for another two minutes in the ribbon blender to disperse the oil.

Water is then added to the dry mix/oil blend at a ratio of 2 parts water to 5 parts dry mix/oil blend. This blend is then mixed in the ribbon blender for an additional 2.5 minutes to form a dough. This dough is then sheeted between two sets of opposing rollers. The first set of rollers has a slightly larger gap than the second set of rollers, such that the dough sheet is progressively calendared thinner as it passes through the two sets of rollers. The final calendared sheet has a thickness of approximately 0.046 inches and a moisture content by weight of approximately 37%, at which point the sheet is then cut by a cutter roll into individual, shaped rectangular pieces.

These shaped pieces are then passed through a forced air oven. This oven has four temperature zones of 560° F./530° F./485° F./430° F. and a dwell time of 1.5 minutes, which will reduce the moisture of the product to about 16% by weight. These high temperatures will also cause the product to expand a form small blisters which impart a light, "chip-like" texture.

The product is now sent to a finishing dryer to further reduce the moisture. The finishing dryer has a temperature of 300° F. and a residence time of 12 minutes at which point the moisture of the product will have been reduced to approximately 1.5% by weight. The resulting product has no single delaminated area over 1.5 inch in diameter.

If the formula of Example 2 is used, except with the removal of the solid, lipid particles, the resulting product is completely delaminated across the whole surface of the chip (100% pillowed). This is true even though all other processing conditions and moisture additions remain the same.

The invention provides for a simple method of controlling the blister size in fabricated expanded snack product that does not adversely affect processing times or the flavor of the finished product. The invention can be used with a variety of snack food products when the size of blisters need to be controlled.

While the invention has been particularly shown and described with reference to a preferred embodiment, it will be understood by those skilled in the art that various changes in form and detail may be made therein without departing from the spirit and scope of the invention.

What is claimed is:

1. A method for producing fabricated, expanded snack products, said method comprising the steps of:
    a) adding solid, lipid particles to a dough having a moisture content, wherein said lipid particles have a largest dimension particle size of between 0.010 inches and 0.10 inches;
    b) forming the dough into dough pieces;
    c) toasting the dough pieces to reduce their moisture content; and
    d) frying the dough pieces to further reduce their moisture content and to form a snack product having a plurality of surface blisters, wherein said blisters generally have a diameter of between 0.125 inches and 1.5 inches.

2. The method of claim 1 wherein the solid, lipid particles have a melting point above 110° F.

3. The method of claim 1 wherein the solid, lipid particles have a melting point above 120° F.

4. The method of claim 1 wherein the solid, lipid particles have a melting point above 140° F.

5. The method of claim 1 wherein the solid, lipid particles have a largest dimension particle size of between 0.010 inches and 0.070 inches.

6. The method of claim 1 wherein the solid, lipid particles have a largest dimension particle size of between 0.020 inches and 0.040 inches.

7. The method of claim 1 wherein the solid, lipid particles are added at a level between 0.1% and 10.0% of the final product weight.

8. The method of claim 1 wherein the solid, lipid particles are added at a level between 1.0% and 3.0% of the final product weight.

9. The method of claim 1 wherein the lipid is selected from a group consisting of triglycerides, mono or diglycerides, reduced-calorie fats, other emulsifiers, animal, marine or vegetable fat which can be partially or fully hydrogenated, nondigestable fats or oils, and reduced calorie fats and oils.

10. The method of claim 1 wherein the moisture content of the dough in step a) is about 50% by weight.

11. The method of claim 1 wherein the snack product comprises farinaceous materials selected from the group consisting of corn, potato, rice, oats, tapioca, wheat, lime-treated corn, buckwheat flour, bean flour, barley flour, wheat germ, rye flour, sorghum flour, and graham flour.

12. The method of claim 1 wherein the snack product comprises added starches.

13. The method of claim 1 wherein the snack product comprises leavening ingredients.

14. The method of claim 1 wherein the snack product comprises other fats or emulsifiers, wherein further the solid, lipid particles are not dissolved in such other fats or emulsifiers.

15. The method of claim 1 wherein the snack product is initially formulated as a dough with a moisture range from 25% to 70% of the total dough.

16. The method of claim 1 wherein the dough is formed into a thin sheet, said sheet ranging in thickness from 0.015 inches to 0.10 inches.

17. The method of claim 1 wherein the solid, lipid particles have an IV value below 15.

18. The method of claim 1 wherein the solid, lipid particles have an IV value below 10.

19. The method of claim 1 wherein the solid, lipid particles have an IV value below 5.

* * * * *